Sept. 5, 1933.    J. H. CUFF ET AL    1,925,523
FOLDABLE TRAY
Original Filed July 15, 1932

INVENTOR
James H. Cuff
Joseph A. M<sup>c</sup>Greevy
BY
ATTORNEY

Patented Sept. 5, 1933

1,925,523

UNITED STATES PATENT OFFICE 1,925,523

FOLDABLE TRAY

James H. Cuff and Joseph A. McGreevy, Brooklyn, N. Y.

Application July 15, 1932, Serial No. 622,638
Renewed April 1, 1933

7 Claims. (Cl. 45—51)

Our present invention relates to a supporting device adapted for use at the lower edges of window openings in automobile bodies or in similar positions, and more particularly to a folding device including a tray and supporting means connected therewith so that the two parts may be folded together when the tray is not in use.

The main object of the invention is to provide advantageous devices of the general character described which are effective in use, simple in structure and economical to manufacture. In its preferred form for application at the interior of automobile bodies the tray is of metal provided at one edge with an upright metal flange to rest against the interior of a door or other part beneath the window opening where the tray is to be applied, and with two perforations adjacent to said flange and spaced equally from opposite ends of the tray.

Suspension of the tray is provided for by use of a single elongated member of resilient material, such as a piece of wire, which has a central portion beneath the tray and extending longitudinally thereof, portions extending in the same general direction from the ends of the central portion and forming the arms of a U of which the central portion is the base, and portions bent upwardly from said arms and shaped at their tops to provide hooks to cooperate with the lower edge of a window opening. The portions of the wire extending from the central portion at the bottom of the tray extend through the perforations in the tray and the general arrangement is such that when the device is open the upright portions of the supporting device extend through said perforations, and when the device is closed the arms of the U or U-shaped part extend through the perforations.

In view of the fact that the folded device may be left in suspended condition, it is desirable to provide for holding the device in closed condition and preferably this result is obtained by having the arms of the U diverge from its base so that when the device is folded the inner sides of the arms will bind against the corresponding portions of the edges of the perforations. The wire at the bends between the arms of the U and the uprights may be so curved that the tray will tend to bind on the wire at and above the curved portions. Preferably also the supporting device is provided, particularly at the hook portions, with coverings of cushioning material such as rubber, to prevent damage to the part on which the hooks are applied.

The folding device may be finished in any desired manner to give it an attractive appearance. For example, devices of this sort may be finished in different colors so as to correspond with the interiors of different cars. It will be evident that when the device is suspended from the lower edge of a car window and the tray or shelf portion is in position for use, the tray will be very convenient for use in holding different articles and particularly so for lunching and the like. Then, when not in use, the tray may be turned up into vertical position where it will be held without rattling.

Other features and advantages will appear upon consideration of the following description and of the accompanying drawing in which Fig. 1 is a fragmentary perspective view illustrating the device in position for use at the interior of a motor car;

Figure 1:
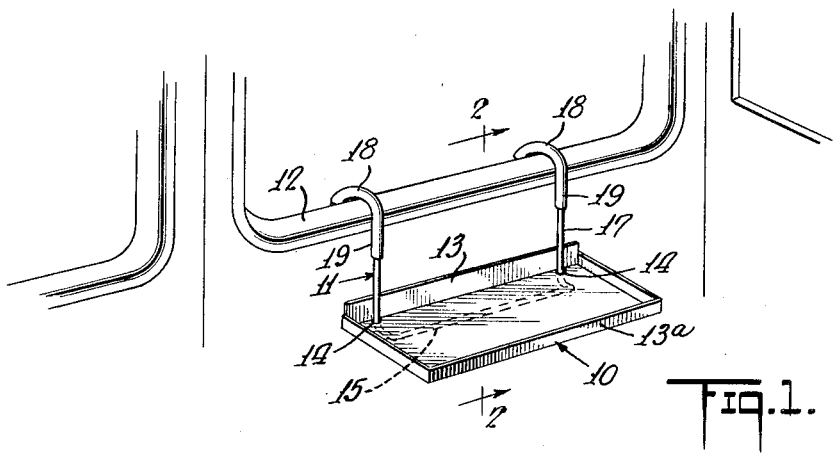

Referring to the drawing, 10 designates a tray, preferably of metal, and 11 a supporting device preferably made of wire and adapted to support the tray from the lower edge 12 of a window opening of a car as illustrated in Fig. 1. The suspension of the tray involves providing it, at the edge to rest against the inside of the car, with an upright flange 13 preferably reinforced at its upper edge by folding the metal to give a double thickness, and by providing in the bottom of the tray close to the flange 13 perforations 14 through which parts of the wire of the supporting device 11 extend. Preferably the tray is provided at its other edges with suitable flanges 13a which serve both to impart strength to the tray and to prevent articles from sliding or falling off of the same.

Preferably, the supporting device 11 comprises a single piece of wire having a central or middle portion 15 beneath the bottom of the tray, arms 16 extending from the ends thereof to form a U-shaped part, and upright portions 17 substantially at right angles with the arms 16, said upright portions 17 being provided at their upper ends with curved hooks 18 adapted to hook over the lower edge of a window opening and said hooks being covered with cushioning material preferably rubber tubes 19 enclosing the wire.

Figure 2:
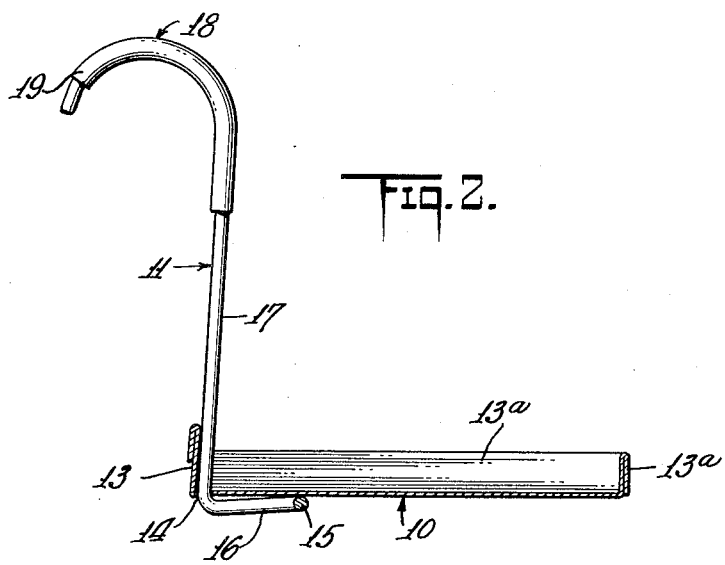
Fig. 2 is a section of the device taken along the line 2—2 of Fig. 1.

When the device is in use, the various parts thereof are substantially in the positions shown in Fig. 2, the flange 13 pressed against the uprights 17 and the edges of the openings or perforations 14 engaging the uprights at the opposite sides just at the tops of the curves connecting the arms 16 with the uprights 17, thus producing a binding effect which tends to prevent relative vertical movement between the tray and the device by which it is supported. Ordinarily the tray 10 will be held above middle portion 15 of the supporting device but may come into contact therewith under various conditions, for example when there is a relatively heavy load on the tray.

Figure 3:
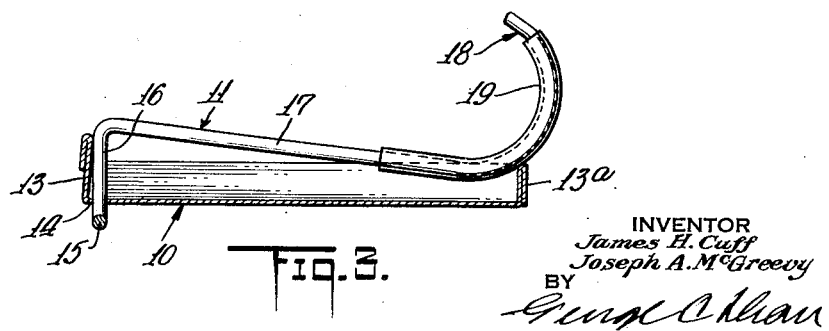
Fig. 3 is a view similar to Fig. 2 but with the device in folded condition.

When not in use, the tray and supporting device are preferably folded into the form shown in Fig. 3 which may be done by swinging the tray and uprights together and pressing the bottom portion of the tray outward toward the middle part 15 of the wire supporting device 11. When the device is in place on a car window sill gravity will hold the tray in folded position. Preferably, however, the arms 16 converge toward the middle portion 15 so that they bind against the edges of the perforations when the bottom of the tray is forced to the position shown in Fig. 3. This binding action assures maintenance of the tray in the folded position, either when the device is suspended from the lower edge of a window as in Fig. 1, or is removed for storage or transportation, as in Fig. 3. Preferably, the arrangement is such that, when in folded position, the curved outer side of each hook has a wedging engagement with the top of the flange 13a at the outer edge of the tray. It will be evident that the device of the present invention is very useful and practical and will take up very little space when not in use.

It should be understood that various changes may be made in the construction and arrangement of parts without departing from the true scope and spirit of the invention. For example, binding of the parts in their Fig. 2 positions might be obtained by utilizing the spring of the arms 16.

We claim:

1. A folding device for attachment at the lower edge of a window opening or the like, including a tray having an upwardly extending flange at one edge, and two perforations adjacent to said flange, slidably engaging an elongated resilient member including a transverse U-shaped part adapted to support the tray, and uprights bent upwardly from the sides of said U-shaped support portion and extending upwardly to hook portions which are adapted to engage over the lower edge of a window opening, whereby the uprights and the tray may be folded together or opened to substantially right angle relation.

2. A folding device for attachment at the lower edge of a window opening or the like, including a tray having an upwardly extending flange at one edge, and two perforations adjacent to said flange, slidably engaging an elongated resilient member including a transverse U-shaped part adapted to support the tray, and uprights bent upwardly from the sides of said U-shaped support portion and extending upwardly to hook portions which are adapted to engage over the lower edge of a window opening, whereby the uprights and the tray may be folded together or opened to substantially right angle relation, the connection between the resilient member and the tray being such as to effect binding between the tray and the resilient member when the parts are in open position.

3. A folding device for attachment at the lower edge of a window opening or the like, including a tray having an upwardly extending flange at one edge, and two perforations adjacent to said flange, slidably engaging an elongated resilient member including a transverse U-shaped part adapted to support the tray, and uprights bent upwardly from the sides of said U-shaped support portion and extending upwardly to hook portions which are adapted to engage over the lower edge of a window opening, whereby the uprights and the tray may be folded together or opened to substantially right angle relation, the connection between the resilient member and the tray being such as to effect binding between the tray and the resilient member when the parts are in either folded or open positions.

4. A folding device for attachment at the lower edge of a window opening or the like, including a tray having an upwardly extending flange at one edge, and two perforations adjacent to said flange, slidably engaging an elongated resilient member including a transverse U-shaped part adapted to support the tray, and uprights bent upwardly from the sides of said U-shaped support portion and extending upwardly to hook portions which are adapted to engage over the lower edge of a window opening, whereby the uprights and the tray may be folded together or opened to substantially right angle relation, the sides of the U-shaped portion being inclined slightly from perpendiculars to the base of the U-shaped portion but in opposite directions whereby said sides will bind in said perforation when the tray and uprights are folded together and the middle portion of the U-shaped portion is pressed toward the bottom of the tray.

5. A folding device for attachment at the lower edge of a window opening or the like, including a tray having an upwardly extending flange at one edge, and two perforations adjacent to said flange, slidably engaging an elongated resilient member including a transverse U-shaped part adapted to support the tray, and uprights bent upwardly from the sides of said U-shaped support portion and extending upwardly to hook portions which are adapted to engage over the lower edge of a window opening, whereby the uprights and the tray may be folded together or opened to substantially right angle relation, the sides of the U-shaped portion being inclined slightly from perpendiculars to the base of the U-shaped portion but in opposite directions whereby said sides will bind in said perforation when the tray and uprights are folded together and the middle portion of the U-shaped portion is pressed toward the bottom of the tray; said hook portions being so positioned that, when the device is folded, the outer sides of the curved hook portions will have wedging engagement with the flange at the opposite side of the tray from the perforations.

6. A folding device for attachment at the lower edge of a window opening and support against the side of the part containing said opening, including a tray having an upwardly extending flange at one edge and two perforations adjacent to said flange, and an elongated resilient member including a U-shaped part at the lower side of the tray and uprights bent upwardly from the sides of the U-shaped portion and then extending upwardly in straight lines to bent portions adapted to engage over the lower edge of the window frame whereby the uprights and the tray may be folded together or opened substantially to a right angle to each other, the sides of the U-shaped portion diverging from the base thereof whereby a binding effect will be obtained when the tray and the uprights are folded together and the base of the U-shaped portion is pressed toward the lower side of the tray.

7. A folding device for attachment at the lower edge of a window opening and support against the side of the part containing said opening, including a tray having an upwardly extending flange at one edge and two perforations adjacent to said flange, and an elongated resilient member including a U-shaped part at the lower side of the tray and uprights curved upwardly from the sides of the U-shaped portion and then extending upwardly in straight lines to hook portions adapted to engage over said edge whereby the uprights and the tray may be folded together or opened substantially to a right angle to each other, and means for producing a binding effect when the tray and the uprights are folded together and the base of the U-shaped portion is pressed toward the lower side of the tray, the curves between the uprights and the sides of the U-shaped part being such that the tray tends to bind on the uprights at the tops of said curves.

JAMES H. CUFF.
JOSEPH A. McGREEVY.